US008869261B1

(12) United States Patent
Carter

(10) Patent No.: US 8,869,261 B1
(45) Date of Patent: Oct. 21, 2014

(54) SECURING ACCESS TO TOUCH-SCREEN DEVICES

(75) Inventor: Kenneth Russell Carter, Los Altos, CA (US)

(73) Assignee: Google Inc., Mountain View, CA (US)

( * ) Notice: Subject to any disclaimer, the term of this patent is extended or adjusted under 35 U.S.C. 154(b) by 276 days.

(21) Appl. No.: 13/462,471

(22) Filed: May 2, 2012

(51) Int. Cl.
G06F 21/00 (2013.01)
G06F 3/0488 (2013.01)
G06F 21/36 (2013.01)

(52) U.S. Cl.
CPC ............ *G06F 21/36* (2013.01); *G06F 3/04883* (2013.01)
USPC ...... 726/14; 726/5; 726/17; 726/26; 713/182; 713/183; 455/410; 455/411

(58) Field of Classification Search
CPC .............................. G06F 21/36; G06F 3/04883
USPC ........................................................ 726/5, 14
See application file for complete search history.

(56) References Cited

U.S. PATENT DOCUMENTS

| 6,052,468 | A * | 4/2000 | Hillhouse | 380/281 |
| 2005/0003799 | A1* | 1/2005 | Kang | 455/411 |
| 2006/0224523 | A1* | 10/2006 | Elvitigala | 705/64 |
| 2010/0107222 | A1* | 4/2010 | Glasser | 726/3 |
| 2010/0180336 | A1* | 7/2010 | Jones et al. | 726/19 |
| 2011/0162420 | A1 | 7/2011 | Lee | |
| 2011/0300831 | A1* | 12/2011 | Chin | 455/411 |
| 2012/0252410 | A1* | 10/2012 | Williams | 455/411 |

FOREIGN PATENT DOCUMENTS

| CN | 2751351 Y | 1/2006 |
| CN | 101340479 A | 1/2009 |
| KR | 20080070319 A | 7/2008 |
| KR | 20100026527 A | 3/2010 |

OTHER PUBLICATIONS

Karch, "Using Your Phone for the First Time", 2010, Chapter 2 of "Android for Work", pp. 15-26.*

* cited by examiner

*Primary Examiner* — Mohammad L Rahman
*Assistant Examiner* — Thaddeus Plecha
(74) *Attorney, Agent, or Firm* — Morris & Kamlay LLP

(57) ABSTRACT

A method is disclosed for adjusting a security interface display on an electronic device. The method comprises a user of an electronic device requesting a change in the display of an interface for entering security code information on the device. The device presents to the user a variety of options related to the manner in which the graphical elements of the security interface may be displayed. The user may select any one or more of the display options. The electronic device thereafter displays a security interface with graphical elements displayed according to the user's selection.

20 Claims, 6 Drawing Sheets

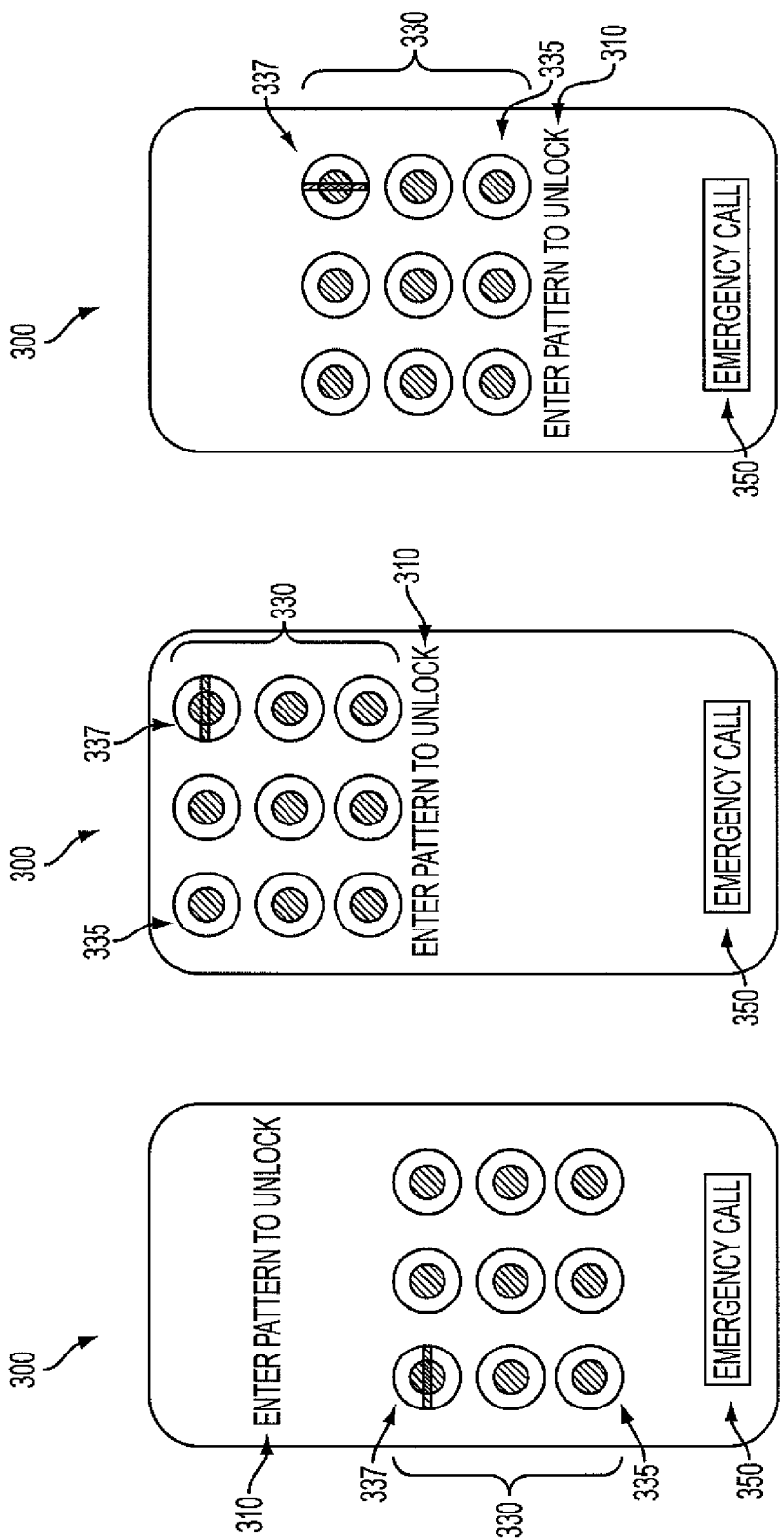

SECURING ACCESS TO TOUCH-SCREEN DEVICES

BACKGROUND

With the advent of improved electronic hardware technology, personal electronic devices have become smaller and more portable. As a result, users frequently carry their portable electronic devices to a variety of venues, especially to publicly accessible sites. Unfortunately, such public venues, including restaurants, public transportation such as busses, and stores, are also accessible to those interested in stealing personal property, such as personal electronic devices. Theft and loss of personal electronic devices, such as smartphones, is sadly frequent. Many current portable electronic devices include security features intended to prevent anyone, except the legitimate owner, from using them and accessing potentially sensitive information.

A common security method is to present the user with a security interface comprising a keypad or similar display, and requesting an input that, in theory, only the legitimate user would know. However, this security feature may not be sufficient. For example, a dedicated thief may secretly observe the user while he or she enters the security code, and memorize the sequence of hand or finger gestures required to unlock the device. Alternatively, the thief, once in possession of the device, may use various means to visualize the finger positions on the touch screen based on the build-up of oils left on the touch screen by the user's fingers. The assumption behind this technique is that the most common touch input on the screen would be the user's security code. If the security interface is a keypad graphic located at a standardized position on the screen, and having a standardized layout, the user would touch the screen at the standardized locations corresponding to the security code. As a result, more finger residue would build up on the touch screen at the positions corresponding to the security code (or minor permutations of the code).

It would, therefore, be useful to provide an improved security interface for a personal electronic device featuring a touch screen input.

SUMMARY

In an embodiment, a method comprises receiving, by a computing device, a request to adjust a device unlock security protocol, the computing device displaying a variety of unlock security protocol options, the computing device receiving a selection of unlock security protocol options from a user, the computing device displaying a device unlock security interface composed of a variety of graphical elements in which the various graphical elements are displayed in a random manner but according to the user's protocol selection, the computing device receiving a device unlock security code based on a user input from the device unlock security interface, the computing device validating the device unlock security code, and unlocking the computing device if the device unlock security code is valid.

In an embodiment, a method comprises a first computing device receiving a request to adjust a device unlock security protocol, the first computing device displaying a variety of unlock security protocol options, the first computing device receiving from a user a selection from the variety of unlock security protocol options, the first computing device transmitting the selection to a second computing device, the second computing device comparing the selection against a list of acceptable security protocol options, the second computing device directing the first computing device to request a different selection from the user if the previous selection is not included in the list of acceptable security protocol options, the first computing device displaying a device unlock security interface composed of a variety of graphical elements in which the variety of graphical elements are displayed in a random positions and/or orientations according to the user's security protocol selection, the first computing device receiving a device unlock security code entered by the user in the device unlock security interface, the first computing device transmitting the security code to the second computing device, the second computing device validating the security code, and the second computing device unlocking the first computing device if the device security code is valid.

BRIEF DESCRIPTION OF THE DRAWINGS

FIGS. 3A-C illustrate further embodiments of alternative security interface displays according to the disclosure.

DETAILED DESCRIPTION

Figures 1A, 1B:
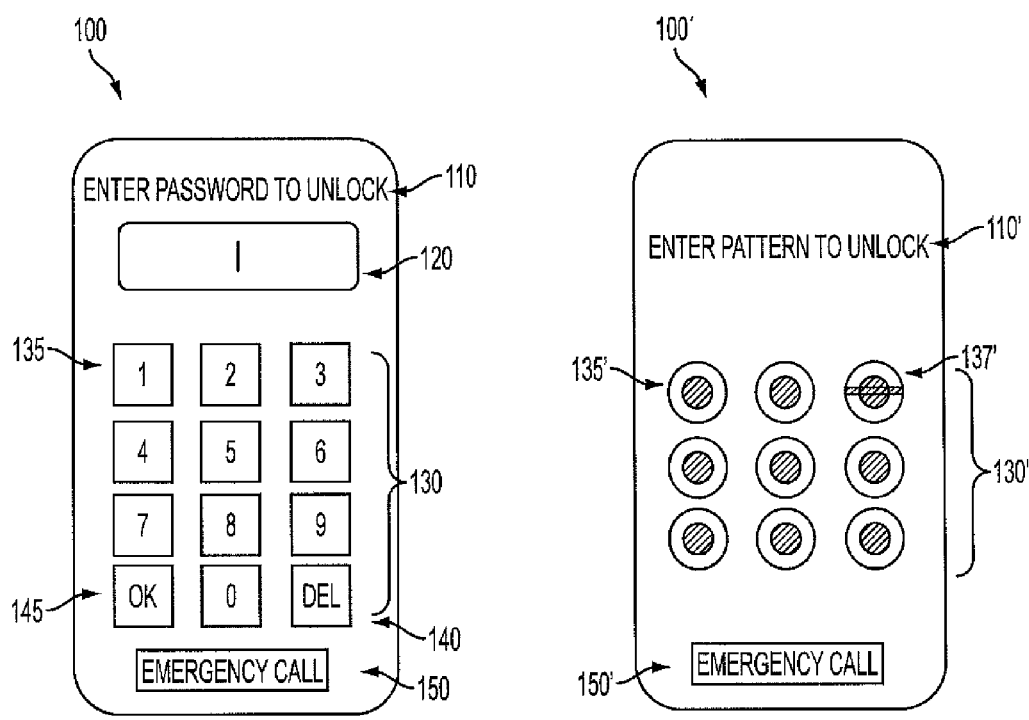
FIGS. 1A-B illustrate embodiments of security interface displays.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this disclosure, the following terms shall have the respective meanings set forth below:

An "electronic device" or a "computing device" refers to an electronic device having a processor, and a memory that performs one or more operations according to one or more programming instructions. Non-limiting examples include personal computers, laptop computers, tablet computers, and smartphones.

A "security interface" is a display of an electronic device comprising graphical elements related to preventing unauthorized access to or use of the electronic device.

An "icon" refers to a graphical element. An icon may include, without limitation, any one or more of the following: a text string, a single character, a graphical image, or an outlined space on a display.

In order to prevent unauthorized use of personal electronic devices, the manufacturers of those devices may include software to present a security interface on the device display upon start up, among other situations. The security interface may be composed of many graphical elements, including, without limitation, a field for displaying user instructions, a keypad or matrix display of letters, numbers, or symbols, a space to display the security code entry, and other graphical elements.

Such interfaces may include a request for a password typed on a hardware or virtual keyboard. Alternative security displays may include a keypad with number or other characters displayed on a touch activated interface (touchscreen) that must be entered as a password or user identifier. Alternatively, the security interface may include a matrix of symbols that must be touched in a specific order. The user may then enter the security code or identification by touching the touchscreen at locations corresponding to the characters displayed by the keypad, or the symbols displayed in the matrix.

Frequently, the security interface is displayed at a standardized location on a touchscreen (for example, a touchscreen display of a smartphone), and the keypad may display its characters such as letters, numbers, or symbols, in a standardized array. Consequently, a user will touch the same areas on the touchscreen each time the interface is used to access the device. In the event that the personal electronic device is stolen or otherwise accessed without permission, the unauthorized user may be able to determine the security code (or at least the component elements of the security code) by determining the areas on the touch screen most often touched by the user based on the oil residues or other marks left by previous usage. Alternatively, an unauthorized user may surreptitiously observe a user entering the passcode, and memorize the finger positions on the touch screen.

FIGS. 1A and 1B illustrate examples of security interfaces that may be used on a smartphone with a touchscreen display. FIG. 1A illustrates a keypad for entering a series of numbers, and FIG. 1B illustrates a matrix of symbols that must be touched, or swept, in a specific order. In FIG. 1A, security interface 100 includes a field to display user instructions 110, a field to display the entered security code 120, and a keypad 130 comprising a number of keys 135 displaying numbers. The user instruction field may display messages to the user, including as non-limiting examples, "Please enter the security code", "Enter password to unlock", "The security code is not valid, please try again", and similar instructions to the user. The field to display the security code may include the values of the keys chosen by the user, or may show only graphical symbols, such as asterisks, to indicate how many password elements have been entered. Additional graphical elements may include a delete key 140 to delete the last-entered element in the event of a mistake, a send or OK key 145 to indicate that the user has completed entry of the security code, and an emergency call key 150, to call for immediate assistance. It is understood that the elements illustrated in FIG. 1A for a keypad-type security interface should not be considered limiting. Any or all of the elements illustrated in FIG. 1A may be used, and additional graphical elements, such as a time display, may also be included. In addition, the keypad display may comprise letters in addition to or instead of numbers. Common non-alphanumeric characters and/or action identifiers, such as punctuation marks, a shift key identifier, a backspace key identifier, and/or a delete key identifier may also be displayed by the keys 135. The keypad may be displayed as a telephone keypad (as illustrated in FIG. 1A) or as an adding machine-type keypad. In addition, spaces between graphical elements may be included to enhanced legibility.

FIG. 1B illustrates an embodiment of a security interface 100' based on a user swiping his or her finger among symbols 135' displayed in a matrix of graphical elements 130'. The symbols 135' of FIG. 1B may be considered similar to the keys 135 in FIG. 1A. In addition, the matrix 130' of symbols in FIG. 1B may be considered similar to the keypad 130 in FIG. 1A. In anticipation of embodiments disclosed below, it is noted that FIG. 1B includes a matrix orientation or start indicator 137, which may comprise a graphical key 135' having an orientation indication included.

As disclosed above, an unauthorized user of the personal electronic device may be able to overcome the security interface, either by observing the finger movements of the legitimate user, or by determining the areas on the touchscreen most often touched by the user. The assumption for this type of security attack is that the user may touch a variety of areas of the touch screen during use depending on a variety of displayed items. However, the user will most likely touch the touch screen at approximately the same set of locations each time the security interface is displayed. As a result, more marks may exists on the touchscreen at locations corresponding to the keys of a keypad or the matrix of symbols corresponding to entries of the security code.

FIGS. 2A-F and FIGS. 3A-C present examples of embodiments of security interface displays that may help to overcome this type of security attack. FIGS. 2A-F present embodiments of alternative displays of the keypad display in FIG. 1A, and FIGS. 3A-C present examples of embodiments of alternative displays of the symbol matrix-type display in FIG. 1B. FIGS. 2A-F and 3A-C all disclose embodiments of a variety of security protocols, each protocol based on a type of randomization of the locations and/or orientations of the graphical elements that comprise the security interface. In these embodiments, the electronic device's security interface display will present a set of graphical elements, but the location and/or orientation of the graphical elements may vary depending on a selected security protocol. As described below in more detail, when device will receives a security input such as a passcode, it will unlock the device if the passcode is correct. If the passcode is incorrect, it may maintain the device in a locked state and continue presenting the security interface display. Optionally the location(s) and orientation(s) of one or more of the graphical elements on the display may be modified after the system receives an incorrect passcode.

Figure 2C:
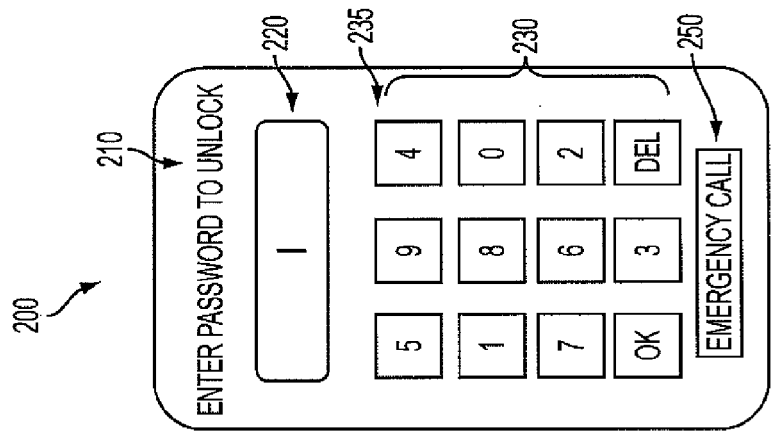
FIGS. 2A-F illustrate embodiments of alternative security interface displays.
Figure 2B:
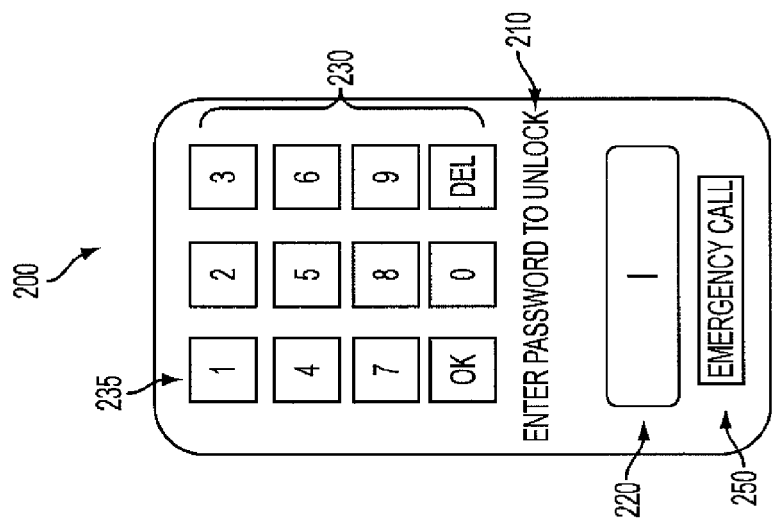
Figure 2A:
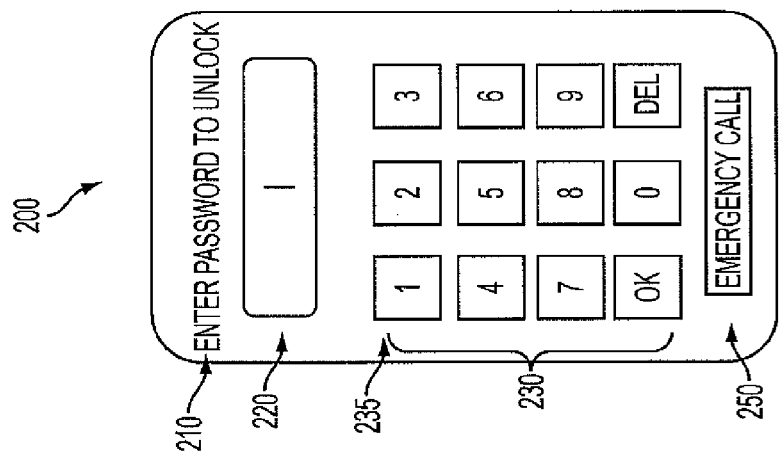

FIG. 2A corresponds to FIG. 1A and illustrates an example of the orientation of the graphical elements of a "standard" keypad-type security interface. As illustrated in FIG. 2A, the graphical elements of keypad display 200 may be, from top to bottom, a user instruction field 210, a data entry field 220, a keypad 230 comprising individual keys 235 and an emergency contact key 250. This ordering of displayed elements may be a 'standard' or 'baseline' configuration, as illustrated in FIG. 1A. By standard or baseline configuration, it is understood that this may be the baseline configuration presented to the user each time the device is activated, and is otherwise unchanged from one user to another. It is understood that the baseline security interface configuration may differ from FIG. 2A for any individual make and model of personal electronic device. Of importance is that the baseline configuration does not change in shape, size, element selection, or positioning from one invocation of the security interface to the next.

Figure 2F:
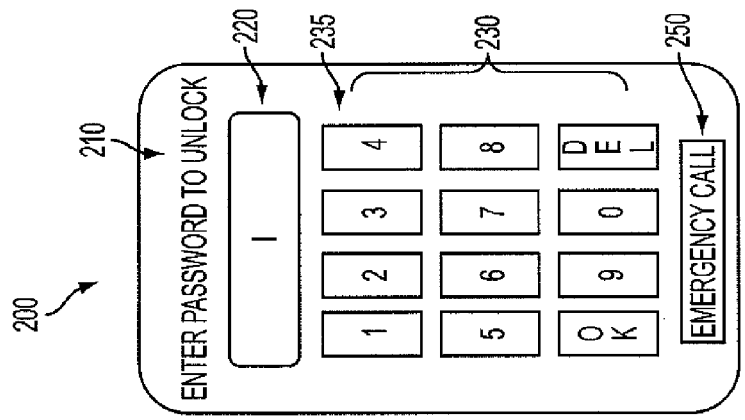
Figure 2E:
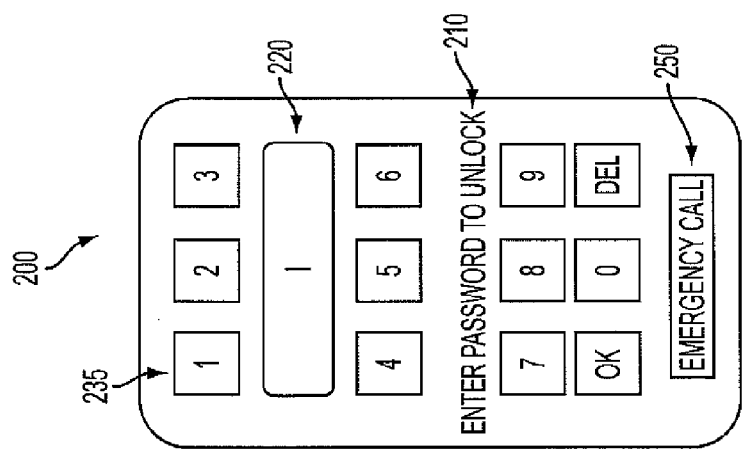
Figure 2D:
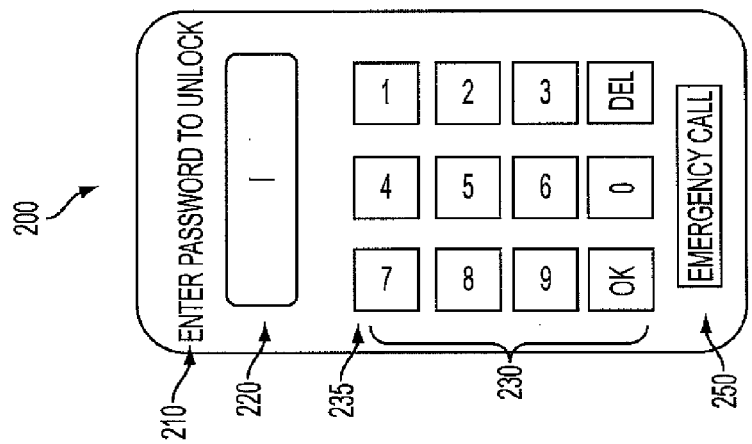

FIG. 2B illustrates an embodiment of a first alternative security interface. In this alternative interface, the order of various graphical elements may be randomly rearranged in the display. Thus, the keypad 230 of keys 235 may be placed above the user instruction field 210, which may be placed in turn above the data entry field 220. This ordering of graphical elements may be compared to the order presented in the 'standard' interface display FIG. 2A. FIG. 2C illustrates a second alternative security interface. In FIG. 2C the order of elements (instruction field 210, data entry field 220, and keypad 230) may be similar to the standard interface. However, the order of the keys 235 within the keypad 230 may be randomized. While only the number keys 235 in FIG. 2C are illustrated as being randomized, it is understood that the delete key (130 in FIG. 1A) and OK or send key (145 in FIG. 1A) may also be included in the randomization process. FIG. 2D illustrates yet another alternative security interface. In FIG. 2D, the order of the graphical elements in the security interface may be similar to the standard interface. However, FIG. 2D illustrates an embodiment in which the keypad 230 may be re-oriented with respect to the standard interface, such as, for example, being rotated clockwise by 90° with respect to a standard interface. An optional indication may be included on at least one of the keys to indicate the orientation of the keypad. FIG. 2E illustrates another alternative interface. FIG. 2E illustrates an embodiment in which the graphical icons may all be randomized. Thus individual keypad keys 235 may be interspersed among the user instruction field 210 and the data entry field 220. It may be appreciated that in this display, there is no keypad 230 since the keys are randomly dispersed about the entire display area. FIG. 2F illustrates yet another alternative security interface. In FIG. 2F, the display elements may be organized in a manner similar to the standard interface: the user instruction field 210 may be located above the data entry field 220, which may be placed above the keypad 230 with keys 235, and having the emergency call button 250 at the bottom. In FIG. 2F, however, the aspect ratio of the keys 235 is altered from the standard configuration. As a result, the standard keypad, having four rows and three columns of keys, is altered to a keypad having three rows and four columns of keys.

It may be understood that the different types of security displays illustrated by FIGS. 2A-F are not limiting, and that other alterations of graphical elements and icons that make up a display are also anticipated by this disclosure. For example, the spacing between rows and/or columns of the keypad may be randomized, or some rows or columns may be offset horizontally or vertically from the others. In yet another embodiment, the spacing between elements (such as between the user instruction field 210 and the data entry field 220) may be altered. Additionally, the different alterations in display element organization and orientation as illustrated in FIGS. 2A-F may be combined. Thus, as merely one example, a security interface may incorporate the randomized key display in FIG. 2C with the randomized key aspect ratio illustrated in FIG. 2F.

In some embodiments, different display configurations may be presented after each entry of an incorrect passcode. For example, a device may initially display a security interface using the configuration of FIG. 2A. If the device receives an incorrect passcode, it may modify the configuration of the security interface so that it looks like that of FIG. 2B. This may continue for each incorrect passcode entry, cycling through the various configurations of FIGS. 2A through 2F, or other configurations, in any order.

FIGS. 3A-C illustrate embodiments of similar alterations to a baseline configuration of a security interface requiring a user to draw his or her finger among a matrix of graphical symbols, such as illustrated in FIG. 1B. Thus, FIG. 3A illustrates an embodiment in which the order of graphical elements may be similar to that of the baseline illustrated in FIG. 1B: the user instruction field 310 may be located above the symbol matrix 330, which in turn may be located above the emergency call button 350. However, the orientation of the matrix of symbols 335 may be altered from that in the baseline. This may be indicated by the location and orientation of the pattern orientation key 337, which indicates in FIG. 3A, as an example, that the matrix is reflected about a vertical centerline. FIG. 3B illustrates an embodiment in which the order or placement of the display elements may be different from the baseline. Thus, the matrix 350 may be located immediately above the user instruction field 310, with no intervening offset or gap. FIG. 3C illustrates an embodiment which combines the alternatives in FIGS. 3A and 3B. The location of the matrix 330 in the display may differ from that in the baseline in FIG. 1B, with the user instruction field 310 located immediately below it. Additionally, the orientation of the matrix may differ from that in FIG. 1B as indicated by the pattern orientation indicator 137 (indicating a reflection about a diagonal line from the upper right key to the lower left key).

The embodiments above disclose a number of security interfaces having their graphical elements randomly disposed in a variety of ways. Such randomization may add to the complexity of the interface use. It is not unusual for a user to memorize the position of keys in a "standard" type of interface, and then use "muscle memory" for moving his or her finger when entering the unlock code. An example of "muscle memory" may be the process used by a person to move a finger (for example) based on remembering the sensation of the muscle movement, and rather than on conscious observation. A user may find it difficult to unlock a randomized display requiring conscious observation of a keyboard as opposed to remembering the feel of moving his or her finger. This issue may be addressed by having "degrees of randomization" for the display of the user interface. Alternative embodiments to those above may include an additional step for a user to determine the degree of randomization of the graphical elements of a specifically selected interface. In one embodiment, a user may be asked to enter the degree of random orientation to be used for the orientation of a keypad or matrix. A fully randomized orientation may allow the axis of the matrix or keypad to be oriented over the entire 360° range with respect to the axis of the device display. Alternatively, the user may request a limited randomization, in which the axis of the keypad or matrix may be randomly oriented only at one of a specified number of orientations, such as at about −90°, about −45°, about 0°, about +45°, or about +90° with respect to the axis of the device display. In another embodiment, a user may be asked to enter the degree of random placement of the security interface with respect to the device display. A fully randomized placement may allow the security interface to be located anywhere on the device display, and may even include wrapping the display around edges, such as from the right edge to the left edge, or from the top to the bottom. Alternatively, the user may request a limited randomization, in which the security display may be randomly located at only one of a small number (e.g. about 3 or about 4) of specific locations on the display. It may be appreciated that the concepts of "full randomization" and "limited randomization" may apply to any or all of the potential security interfaces disclosed above. In addition, it may be understood that either the user or the corporate supplier of the device may chose the types of security protocols and their degree of randomization or complexity.

Each type of security interface may be embodied in a software unlock security protocol. The user may be presented a list of security protocol options, for example on a drop down menu, from which to choose one or more selections. After receiving the selected protocol or protocols from the user, the device will display the unlock security interface according to the protocol or protocols chosen by the user. The user, upon observing the new security interface, may then use it to enter the user's security code. The code may be authenticated or validated according to any of a number of methods as known in the art, and the device may be unlocked once the correct security code has been entered.

In one embodiment, the user may be presented with options to change the security interface protocol options during a device setup procedure. In another embodiment, the user may request a change in the unlock security protocol at any time while the device is in use. In yet another embodiment, the user may be presented with a request to select a new security interface protocol (or protocols) each time the electronic device is activated. If the device is provided to the user by the user's employer, the employer may have security policies that restrict the user from selecting some of the security protocol options. Under those conditions, if the user selects protocol options not permitted by the company, the device may display a user instruction to choose another one or several protocol options.

Figure 4:
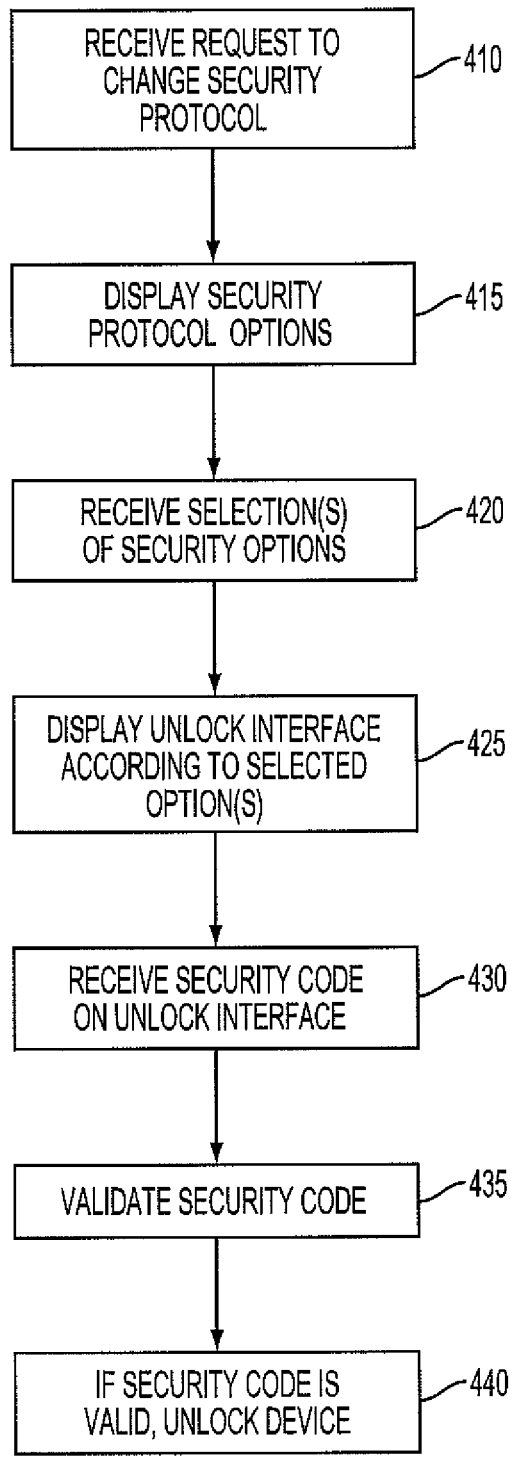
FIG. 4 is a flow chart of an embodiment of a method according to the disclosure.

FIG. 4 is a flowchart of a non-limiting embodiment of a method to adjust the security protocol or protocols used to unlock an electronic device.

The electronic device may receive from a user a request to change the security protocol 410. The user may be prompted to supply this request, or the user may initiate this request. Upon receipt of the request, the device may display a list of possible security protocol options 415. In one embodiment, list may be displayed as a drop-down menu. In another embodiment, the device may display a separate screen presenting the options. In one embodiment, the options may be presented as text descriptors of the operations to be applied to the graphical elements, such as "randomize matrix orientation" or "randomize keypad numbering". In another embodiment, the options may be presented as graphical descriptors of the operations to be applied to the graphical elements, such as a graphic showing a keypad-type interface with randomly placed elements. The user may select the option or options, and the electronic device may then receive the selection 420. In one embodiment, the electronic device may be programmed with security policy information from an employer, and the device may compare the list of user-selected protocols against a list of acceptable protocols based on the security policy. In another embodiment, the electronic device may forward the selection to a server or other computing device, and the computing device may compare the user-supplied options against the list of acceptable options. If the user selection is compared to a list of acceptable protocols, and one or more of the protocols selected is not among the list of acceptable protocols, the electronic device may notify the user that the protocols are not acceptable, and prompt the user to make a new selection. If the electronic device performs the protocol selection comparison, it may display the notification. If the server or other computing device performs the protocol selection comparison, the computing device may direct the electronic device to display the notification.

Once the selection of security protocols is accepted by the electronic device, the electronic device may display the unlock security interface according to the selected protocol(s) 425. The step of displaying may include the step of selecting a random configuration for the graphical elements of the interface in accordance with the selected protocols. In one non-limiting example, if the user chose the protocol option "randomize keypad numbering", the security interface may display a standard keypad-type interface in which the numbers on the keys are randomized each time the device is activated. In another non-limiting example, if the user chose the protocol option "randomize all keypad graphical elements", the security interface may display the keypad keys and other graphical elements, such as the user instruction field at random locations on the device display each time the device is activated.

Once the security interface is displayed by the electronic device, the user may enter a security code according to the type of interface provided 430. Thus, if a keypad-type interface is displayed, the user may touch the touchscreen at the location of the keys corresponding to the security code. If the user enters an incorrect code, the user may delete that code or portions of it by touching a key (or other icon) indicating that the code entered into the data entry field should be corrected. If the user believes the security code has been entered correctly, the user may touch a key or other icon indicating that the code should be input into the electronic device.

In one embodiment, the electronic device may validate the security code entry to ensure that the correct code has been received 435. (Note that as used in this document, the term "code" may include a gesture sequence, such as that described in the text accompanying FIGS. 3A-3C above.) In another embodiment, the electronic device may send the security code entry to another computing device for validation. If the security code is not valid, the electronic device may notify the user to try again. If a second computing device is used to validate the security code, it may direct the electronic device to display such a notice. In one embodiment, the electronic device may lock out the user if the number of incorrect security codes entered by the user exceeds a preset limit.

Once the user enters a valid security code, the electronic device may be unlocked and available to the user 440. In one embodiment, the electronic device may validate the security code and unlock itself. In another embodiment, the security code may be sent to a computing device for validation, and if the code is validated, the computing device may cause the electronic device to unlock.

While the embodiments disclosed above describe methods for providing a randomized security interface for securing access to a device such as a cell phone, it is understood that similar methods may be used to secure individual functions on or associated with such a device. Thus, as one example, specific applications or portions of applications stored on a tablet computer, such as a stock market tracker, may be secured by use of such a security interface. In another example, access to some websites may be secured using similar methods. In yet another example, similar methods may be used to secure access to some device functions such as the camera of a cell phone.

It may also be appreciated that the embodiments disclosed above for providing a randomized security system interface may equally apply to a variety of security applications. In addition to restricting access to mobile electronic devices such as cell phone, or to software or hardware options available on them, the methods associated with randomized security system interfaces may be of benefit to physical security systems. Soft keypads, comprising, for example, one or more key-pad type displays on touch sensitive interfaces, may be used as part of security systems to restrict physical access to buildings, rooms, or other secured areas. In these systems, the "unlock" function may apply to physically unlocking an entrance to an area. The displays may also be useful to restrict physical access to automated cash machines, safes, and safety deposit boxes, among a list of physically securable items.

While the embodiments of the methods disclosed above may reside on either a single device (stand-alone configuration) or distributed among two devices (such as in a client/server configuration), it may be appreciated that the steps associated with the methods may be distributed among any number of devices. For example, a cell phone (as a client) may communicate the selected security protocol options to one device for comparison with an acceptable protocol list (a first server), but may communicate the received unlock security code with a separate device for code validation (a second server). In another example, the security protocol selection may be made at one device (for example, a central server) in order to program the security interface display of a separate stand-alone device (for example, a soft keypad for building access).

In addition, although the present disclosure addresses the visual presentation and programming of graphical elements on a touch-screen security interface, it is understood that such a security interface may be used along with or in addition to any one or more additional security features. The use of multiple security features, frequently termed "layering", may be used to secure access to highly sensitive information. As one example, a user may be required to use the touch-screen security interface disclosed above before being required to negotiate a secondary security feature, such as one requiring the use of an authorization token.

Figure 5:
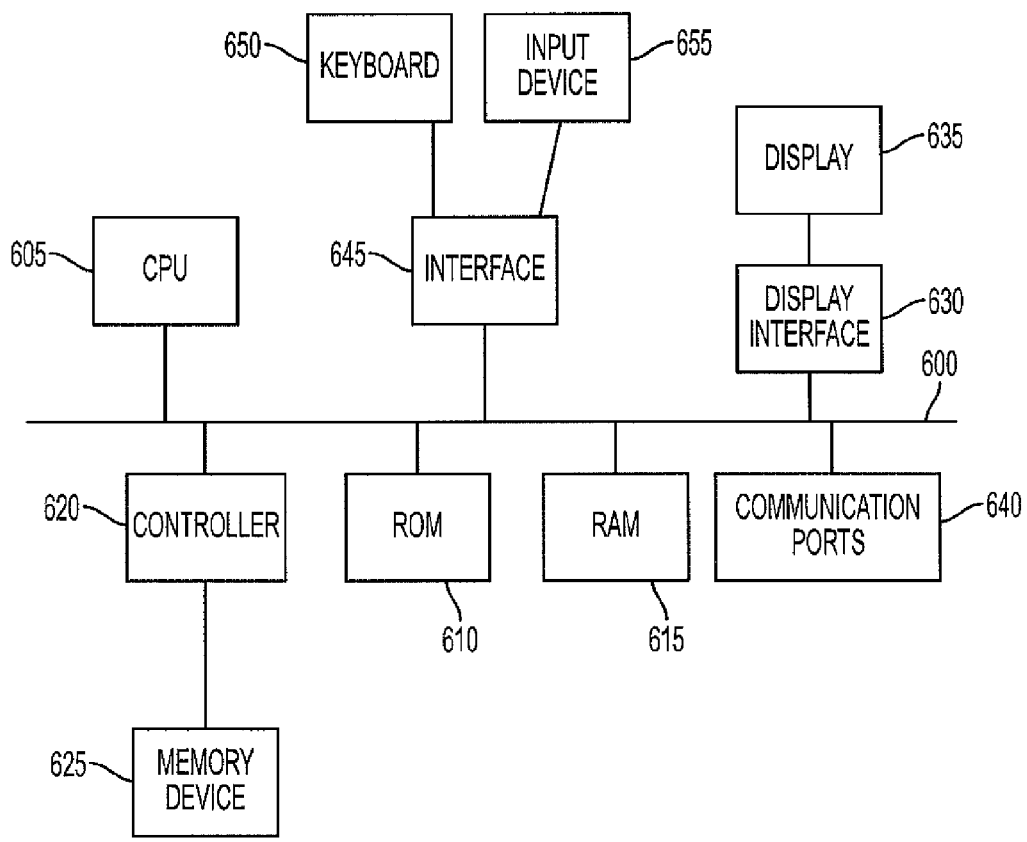
FIG. 5 is a block diagram illustrating elements that may be included in a computer system.

FIG. 5 depicts a block diagram of internal hardware that may be used to contain or implement the various services and processing devices as discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 5, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
receiving, by a computing device, a request to adjust a device unlock security protocol;
displaying, at the computing device, a plurality of unlock security protocol options;
receiving, by the computing device, a selection from the plurality of unlock security protocol options;
comparing the selection against a list of acceptable security protocol options;
if the selection is not in the list of acceptable security protocol options, requesting, by the computing device, a different selection from the plurality of unlock security protocol options;
receiving, by the computing device from a user, a degree of randomization that represents a degree of random orientation associated with a plurality of graphical elements;
determining a configuration for the plurality of graphical elements by randomly selecting one or more of the graphical elements to be positioned in one or more locations in accordance with the selected unlock security protocol and the received degree of randomization;
displaying, by the computing device, a device unlock security interface comprising the plurality of graphical elements in accordance with the determined configuration;
receiving, by the computing device, a device unlock security code based on an input from the device unlock security interface;
validating, by the computing device, the received device unlock security code; and
if the received device unlock security code is valid, unlocking the computing device.

2. The method of claim 1, wherein the plurality of graphical elements comprises one or more of the following: an icon displaying an alphabetical character, an icon displaying a numerical character, an icon displaying a character that is neither an alphabetical character nor a numerical character, and a graphical shape.

3. The method of claim 1, wherein the plurality of graphical elements further comprises one or more of the following: a data field requesting an entry in the device unlock security interface, a data field related to the entry in the device unlock security interface, an icon displaying a tag for applying a correction to the entry in the device unlock security interface, and an icon displaying a tag for sending the entry in the device unlock security interface to the computing device.

4. The method of claim 1, wherein the device unlock security interface further comprises a keypad having a plurality of keys, each of the plurality of keys displaying any one or more of the following: an alphabetical character, a numerical character, and a text descriptor.

5. The method of claim 4, wherein the selected security protocol comprises displaying the plurality of keys in any one or more of the following ways: in a numerical order, in an alphabetical order, in a random order, with an orientation indicium, and with a random aspect ratio.

6. The method of claim 4, wherein the selected security protocol comprises displaying the keypad on a display of the computing device in any one or more of the following ways: in a random orientation with respect to an axis of the display and in a random location of the display.

7. The method of claim 1, wherein the device unlock security interface is in the form of a matrix of graphical symbols.

8. The method of claim 7, wherein the selected security protocol comprises displaying the matrix on a display of the computing device in any one or more of the following ways: with a random aspect ratio, in a random orientation with respect to an axis of the display, at a random location of the display, and with at least an indicium indicating the orientation of the matrix with respect to the axis of the display.

9. The method of claim 1, wherein the selected security protocol comprises displaying each of the plurality of graphical elements at a random location on a display of the computing device.

10. The method of claim 1, wherein receiving a degree of randomization comprises one of the following:
   receiving an indication, by the computing device from the user, that the graphical elements are to have a fully randomized orientation; and
   receiving an indication, by the computing device from the user, that the graphical elements are to have a limited randomization.

11. The method of claim 1, further comprising:
   receiving, by the computing device, a degree of random placement associated with the device unlock security interface,
   wherein displaying the device unlock security interface comprises displaying the device unlock security interface in accordance with the received degree of random placement.

12. A method, comprising:
   receiving, by a first computing device, a request to adjust a device unlock security protocol;
   displaying, at the first computing device, a plurality of unlock security protocol options;
   receiving, by the first computing device, a selection from the plurality of unlock security protocol options;
   transmitting, from the first computing device to a second computing device, the selection;
   comparing, by the second computing device, the selection against a list of acceptable security protocol options, wherein each acceptable security protocol option is associated with a degree of randomization of one or more graphical elements, a location of one or more graphical elements, or both a degree of randomization and an orientation of one or more graphical elements;
   if the selection is not included in the list of acceptable security protocol options, directing, by the second computing device, the first computing device to request a different selection from the plurality of unlock security protocol options;
   displaying, by the first computing device, a device unlock security interface by randomly positioning one or more of graphical elements in one or more locations in accordance with the selected unlock security protocol;
   receiving, by the first computing device, a device unlock security code based on an input from the device unlock security interface;
   transmitting, from the first computing device to the second computing device, the device unlock security code;
   validating, by the second computing device, the device unlock security code; and
   if the device unlock security code is valid, causing, by the second computing device, the first computing device to unlock.

13. The method of claim 12, wherein the plurality of graphical elements comprises one or more of the following: an icon displaying an alphabetical character, an icon displaying a numerical character, an icon displaying a character that is neither an alphabetical character nor a numerical character, and a graphical shape.

14. The method of claim 12, wherein the plurality of graphical elements further comprises one or more of the following: a data field requesting an entry in the device unlock security interface, a data field related to the entry in the device unlock security interface, an icon displaying a tag for applying a correction to the entry in the device unlock security interface, and an icon displaying a tag for sending the entry in the device unlock security interface to the computing device.

15. The method of claim 12, wherein the device unlock security interface further comprises a keypad having a plurality of keys, each of the plurality of keys displaying any one or more of the following: an alphabetical character, a numerical character, and a text descriptor.

16. The method of claim 15, wherein the selection comprises displaying the plurality of keys in any one or more of the following ways: in a numerical order, in an alphabetical order, in a random order, with an orientation indicium, and with a random aspect ratio.

17. The method of claim 15, wherein the selection comprises displaying the keypad on a display of the first computing device in any one or more of the following ways: in a random orientation with respect to an axis of the display and in a random location of the display.

18. The method of claim 12, wherein the device unlock security interface is in the form of a matrix of graphical symbols.

19. The method of claim 18, wherein the selection comprises displaying the matrix on a display of the first computing device in any one or more of the following ways: with a random aspect ratio, in a random orientation with respect to an axis of the display, at a random location of the display, and with at least an indicium indicating the orientation of the matrix with respect to the axis of the display.

20. The method of claim 12, wherein the selection comprises displaying each of the plurality of graphical elements in a random location on a display of the first computing device.

* * * * *